Figure 3:
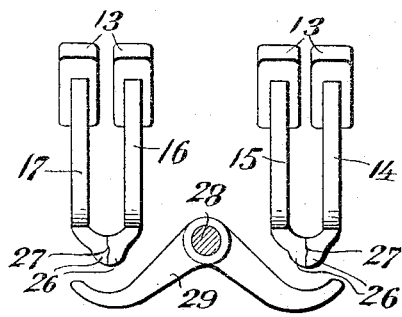

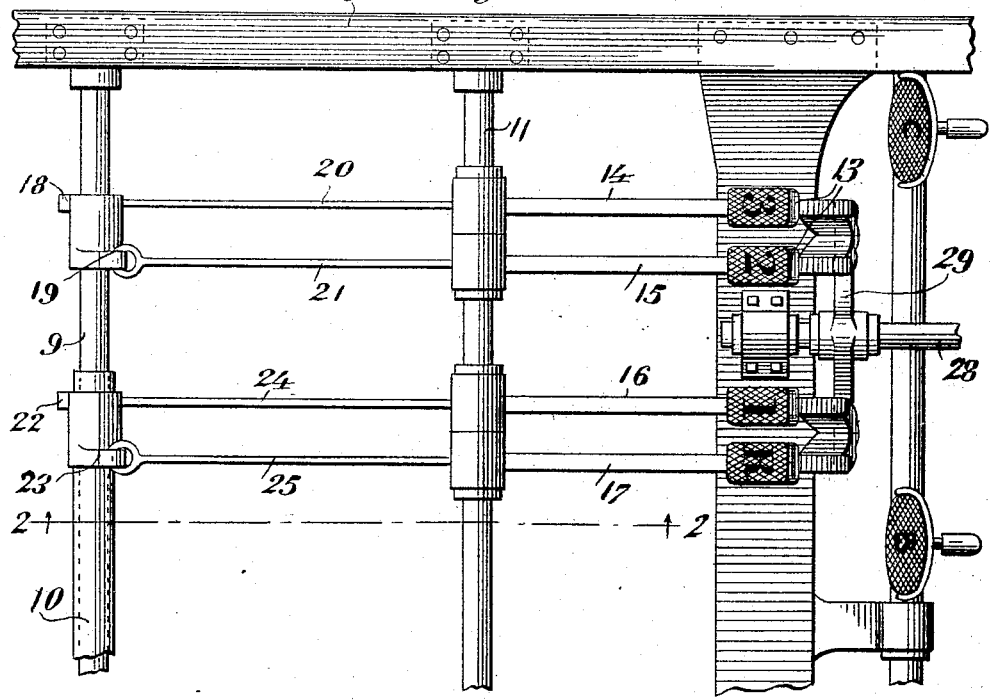
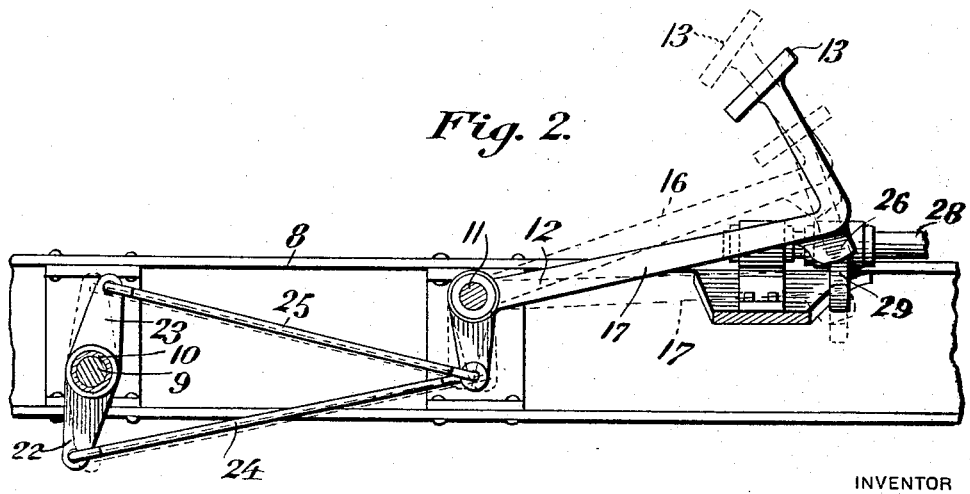

J. J. SIMS.
GEAR SHIFTING MECHANISM.
APPLICATION FILED MAY 22, 1916.

1,213,283.

Patented Jan. 23, 1917.
2 SHEETS—SHEET 2.

NEUTRAL

REVERSE

LOW

SECOND

HIGH

WITNESSES

INVENTOR
John J. Sims
BY
Richard B. Owen
ATTORNEY

UNITED STATES PATENT OFFICE.

JOHN J. SIMS, OF MASSEY, ONTARIO, CANADA.

GEAR-SHIFTING MECHANISM.

1,213,283.

Specification of Letters Patent.

Patented Jan. 23, 1917.

Application filed May 22, 1916. Serial No. 99,228.

*To all whom it may concern:*

Be it known that I, JOHN J. SIMS, a subject of the King of Great Britain, residing at Massey, in the Province of Ontario and Dominion of Canada, have invented certain new and useful Improvements in Gear-Shifting Mechanisms, of which the following is a specification.

This invention relates to gear shifting mechanisms for motor vehicles, and has for its primary object to provide a simple and improved means for rotating gear shifting shafts selectively for intermeshing the proper or desired gears, and for obviating the jolts and strains incident to the gear shifting operations, as well as preventing stripping or injury to the various gears.

A further object of the invention is to provide a gear shifting mechanism of this character which is capable of being actuated by foot levers or pedals, whereby the desired gears may be quickly and easily intermeshed, the levers being constructed and arranged in such manner as to prevent accidental movement or depression of the same, and the construction being such that the gears will be moved to neutral or disengaged position before being shifted from one to the other of the driven gears.

A still further object of the invention is to provide a device of this construction which is simplified and inexpensive in construction, which is composed of but few readily assembled parts, all so constructed and arranged as to preclude the possibility of breakage, wear or derangement of the same, which is easy of operation, and which will prove thoroughly efficient in the attainment of the ends for which it is designed.

With these objects in view, together with others which will appear as the description proceeds, the invention resides in the novel combination and arrangement of parts, all as will be described more fully hereinafter illustrated in the drawings, and particularly pointed out in the claims.

Figure 4:
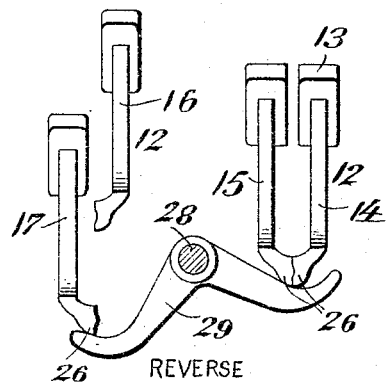
Figure 5:
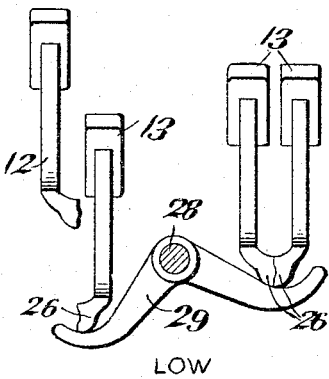
Figure 6:
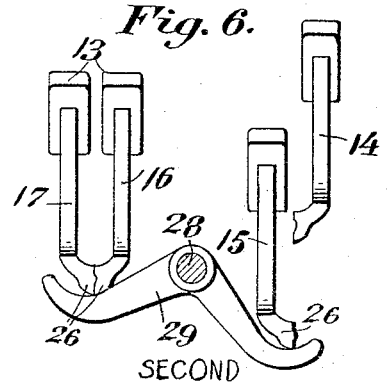
Figure 7:
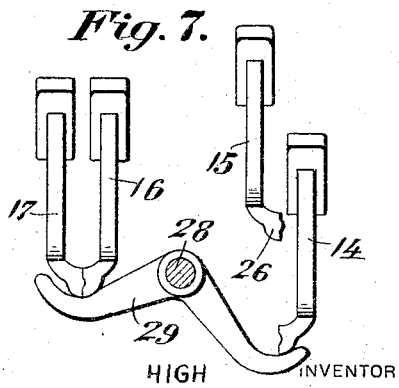

The invention will be best understood by reference to the accompanying drawings wherein:

Figure 1 is a fragmentary plan view of a portion of a motor vehicle frame and illustrating the application of a gear shifting mechanism embodying my invention, Fig. 2 is a sectional view taken on the line 2—2 of Fig. 1, Fig. 3 is a diagram of the pedals for actuating the speed change gears and showing the same in the position they will assume when the speed gears are in neutral or disengaged position, Fig. 4 is a similar view showing the position of the levers when moved to reverse the vehicle, Fig. 5 is a similar view showing the levers operated to engage the low speed gears, Fig. 6 is a similar view showing the levers moved to engage the second or intermediate speed gears, and Fig. 7 is a similar view illustrating the position as the levers are moved to engage the high speed gears.

Referring now more particularly to the drawings, 8 indicates the frame of a conventional form of motor vehicle, upon which the shafts 9 and 10 are mounted for rocking movement, the said shafts being adapted upon rocking movement to engage or disengage the various gears for changing the speed or direction of movement of the vehicle. The shaft 10 is a sleeve shaft and is adapted to operate such of the shifting gears as will drive the transmission shaft at low and reverse speeds, while the shaft 9 is adapted to operate the second or intermediate and high speed gears. The manner in which the rocking movement of the shafts 9 and 10 operates upon the speed changing gears forming no part of the present invention, will not be here described.

Mounted parallel to and preferably in advance of the shafts 9 and 10, is a lever supporting axle or shaft 11, upon which a plurality of levers 12 are mounted for oscillation. The members 12 are in the form of bell-crank levers and are arranged in pairs upon the axle 11; the levers extending forwardly from the axle 11 and are bent upwardly at their forward extremities to provide pedal or foot-engaging portions 13 projecting above the floor of the vehicle and in a position within convenient reach of the foot of the vehicle operator. The levers of each pair are capable of independent rotation upon the supporting shaft or axle 11, and the pair of levers at the extreme left of the vehicle frame indicated at 14 and 15, respectively, are adapted to control the gears for high and intermediate or second speeds, while the other pair of levers are adapted to control the gears for governing the low and reverse speeds of the vehicle. The last-mentioned levers are indicated at 16 and 17 respectively. The shaft 9 is provided with a pair of oppositely extending arms 18 and 19, the former being connected by a link 20 to the depending portion or arm of the bell-crank lever 14, while the arm 19 is connected by a link 21 to the arm of the bell-crank lever 15. The sleeve shaft 10 is in a like manner equipped with oppositely extending arms 22 and 23, the former being connected by a link 24 to the bell-crank lever 16, while the latter is connected by a link 25 to the lever 17. It is apparent from this construction, and with particular reference to Fig. 2 of the drawings, that depression of the foot lever 17 will rock rearwardly upon the sleeve 10, whereby the gears will be shifted to reversing position, and at the same time the arm 22 will, through the link 24, move the bell-crank lever 16 upwardly as is shown by dotted lines. When it is desired to disconnect the reversing gears, the bell-crank lever 16 is depressed, whereupon the sleeve shaft 10 is rocked in a reverse direction and the gears disconnected. When the pedals 13 are all in horizontal alinement, the speed change gears are in neutral or disconnected position, and the levers of each pair are provided with pendant fingers 26, the fingers of each pair extending toward each other in meshing engagement directly beneath the pedal portions 13, and are provided with coöperating notched faces 27. The engaging extremities of the fingers are so arranged that they will interlock when the pedal or foot indicating portions 13 of the levers are parallel, and to depress one or the other of the levers of each pedal it is essential that pressure be applied to the desired pedal sufficient to overcome the resistance due to the coöperation of the engaging surfaces of the pendant fingers 26. By this construction, it is apparent that as the levers assume parallel or neutral position, they will be yieldably so held.

Positioned between each pair of bell-crank levers and extending in the same general direction therewith is a stub axle 28. Mounted for rocking movement upon this axle is a rocker arm 29, the opposing ends of which extend downwardly and directly beneath the finger portions 26 of the opposite pairs of bell-crank levers 12. When the speed changing gears are in neutral or disengaged position, the rocker arm 29 assumes neutral position, with its extremities spaced beneath depending fingers 26 of the various foot levers a distance substantially one-half that necessary for the downward movement of the bell crank levers in shifting the gears from one position to the other. Obviously, upon depression of the lever 17, see Figs. 3 and 4, the coacting faces of the fingers 26 will first be disengaged and the downwardly traveling finger of the lever 17 will engage the rock arm extremity 29 lying beneath the same. This degree of movement, however, being insufficient to move the reverse speed gear, the lever 17 is further depressed, rocking the underlying end of the rock arm 29, and forcing the opposite end of the arm upwardly to engage the pendant fingers 26 of the levers 14 and 15. As has been before mentioned, depression of one of the levers of a pair moves the associated lever upwardly, and upon depression of the upwardly extending lever, each associated lever immediately travels upwardly. As the levers become horizontally alined, the notched faces of the fingers 26 engage whereby the said levers are momentarily held in such position that the speed gears will be in neutral or disengaged position. To further shift the gear controlled by depression of the lever 16, the latter must be forced downwardly and from engagement with the finger 26 of the associated lever, whereupon the gear controlled by the lever 16 will be properly shifted, and the rock arm 29 will limit the depression of the lever 16. It will be observed that the rocking movement of the member 29 is limited by engagement of its opposing ends with the pendant fingers of the arms of the various pairs.

From this construction it is apparent that a convenient gear shifting mechanism is provided, and one wherein the return of the various gears to neutral position is assured before other movements of the speed change gears can be made. It will also be observed that the limit of depression of the various pedals is limited by the rock arm 29. It will be further observed that the gear shifting mechanism operable by foot levers enables the speed of the vehicle to be quickly and conveniently varied.

While the above is a disclosure of the preferred embodiment of the invention I am aware that the same is susceptible of various changes in the minor details of construction and arrangement of parts without departing from the spirit of the invention, and I reserve to myself the right to make such changes as may be deemed practicable without exceeding the scope of the claims.

I claim:

1. The combination with a gear shaft, arms on said shaft, a pair of levers, connections between said levers and said arms and coöperating means on said levers for holding the latter yieldably engaged with each other, substantially as described.

2. The combination with a gear shaft, arms on said shaft, a pair of levers, connections between said levers and said arms, and gripping fingers on each lever, the said fingers being adapted to yieldably engage with each other, substantially as described.

3. The combination with a gear shaft, arms on said shaft, pairs of levers, connections between said levers and said arms, one of said levers being adapted to move in a reverse direction upon forward movement of the other lever, and notched fingers carried by each lever and adapted to engage when said levers are at intermediate positions in their movement, substantially as described.

4. The combination with a gear shaft, arms projecting in opposite directions from said shaft, a pair of bell crank levers, links connecting said levers and said arms, gripping fingers projecting toward each other from said levers and adapted to yieldably engage when said levers are parallel, and means for limiting the downward movement of said levers, substantially as described.

5. The combination with gear shafts, arms on each of said shafts, a pair of levers for each of said shafts, connections between the levers of each pair and the arms of the corresponding shafts, a stud axle arranged between and adjacent the extremities of said levers, a rocker arm mounted on said axle beneath said levers, and gripping fingers on said levers adapted to engage with said rocker arm upon depression of the levers, substantially as described.

6. The combination with gear shafts, oppositely projecting arms on each of said shafts, a pair of bell crank levers for each of said shafts, links connecting said levers with the arms of the respective shafts, a rocker member disposed transversely of the levers between the same and adjacent their lower extremities, the extremities of said rocker member being spaced beneath said levers when the latter are horizontally alined, substantially as described.

In testimony whereof I affix my signature in presence of two witnesses.

JOHN J. SIMS.

Witnesses:
R. I. FRASER,
F. N. BYERS.

Copies of this patent may be obtained for five cents each, by addressing the "Commissioner of Patents, Washington, D. C."